No. 690,314. Patented Dec. 31, 1901.
P. O. NOREN & M. D. CLYBURN.
COMBINED CULTIVATOR AND PLANTER.
(Application filed Aug. 17, 1901.)
(No Model.) 2 Sheets—Sheet 1.
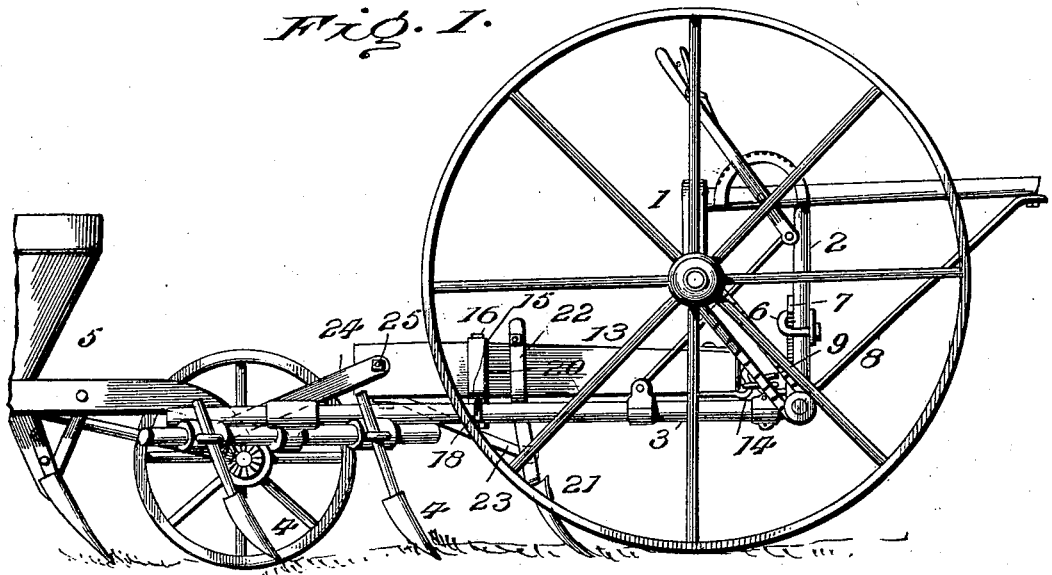
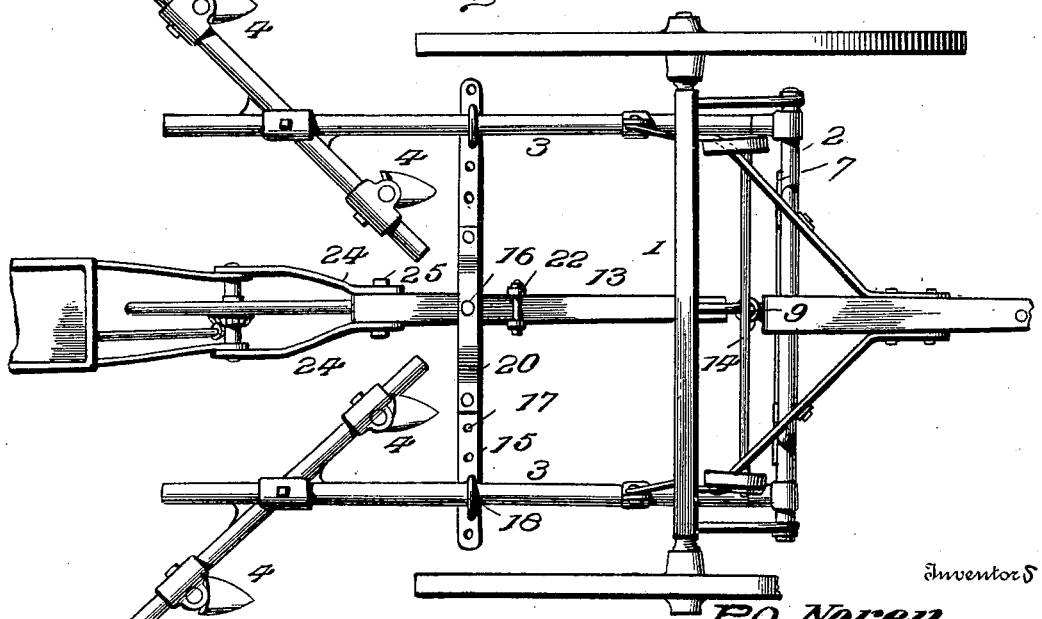

No. 690,314. Patented Dec. 31, 1901.
P. O. NOREN & M. D. CLYBURN.
COMBINED CULTIVATOR AND PLANTER.
(Application filed Aug. 17, 1901.)
(No Model.) 2 Sheets—Sheet 2.
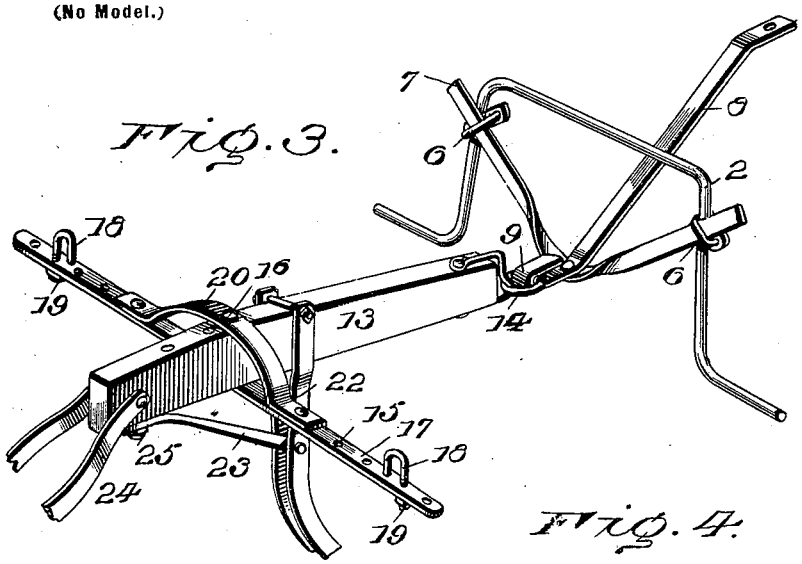
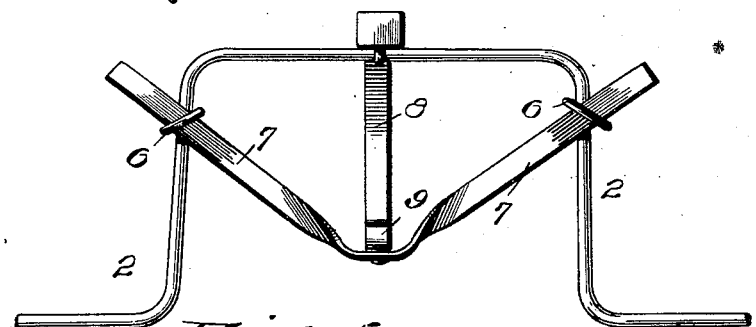
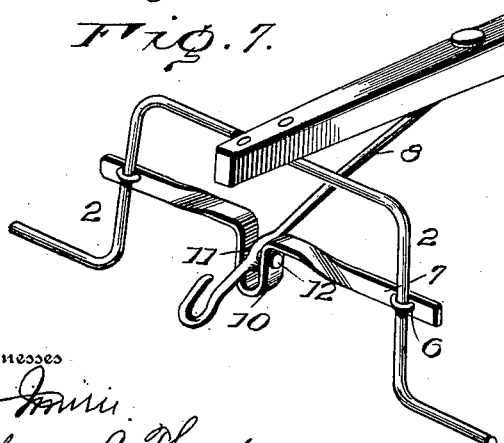
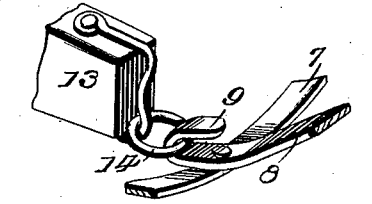
Inventors
P. O. Noren.
M. D. Clyburn

UNITED STATES PATENT OFFICE.

PETER O. NOREN AND MILE D. CLYBURN, OF CREEDMOOR, TEXAS.

COMBINED CULTIVATOR AND PLANTER.

SPECIFICATION forming part of Letters Patent No. 690,314, dated December 31, 1901.

Application filed August 17, 1901. Serial No. 72,424. (No model.)

*To all whom it may concern:*

Be it known that we, PETER O. NOREN and MILE D. CLYBURN, citizens of the United States, residing at Creedmoor, in the county of Travis and State of Texas, have invented certain new and useful Improvements in a Combined Cultivator and Planter; and we do hereby declare the following to be a full, clear, and exact description of the invention, such as will enable others skilled in the art to which it appertains to make and use the same.

This invention relates to a combined cultivator and planter, and more particularly to an attachment applicable to any ordinary construction of cultivator for connecting a central or sweep plow and a cultivator thereto, the parts of the attachment being readily removable from the cultivator, so that the cultivator may be used alone whenever desired.

The object of the invention is to provide an attachment of this character by means of which the several and successive operations of bedding the land, plowing out the ridges, and planting the seed may be simultaneously carried out by one and the same implement, thus effecting a saving in the number of hands and draft-animals employed.

With this and other objects in view, which will appear as the nature of the improvements is better understood, the invention consists of certain novel features of construction, combination, and arrangement of parts, as will be hereinafter more fully described, and particularly pointed out in the appended claims.

In the accompanying drawings, Figure 1 is a side elevation of a combined cultivator and planter embodying our invention. Fig. 2 is a top plan view thereof. Fig. 3 is a perspective view of the attachment removed. Fig. 4 is a rear elevation of the arch of the cultivator, the tongue or pole, and the adjustable draft-bar of the attachment applied to the arch. Fig. 5 is a rear elevation of the center beam and applied parts. Fig. 6 is a detail view of the adjustable swivel connection between the cultivator-beams and the center-beam-supporting bar of the attachment; and Fig. 7 is a detail view of a modified form of draft-bar.

Like reference characters designate corresponding parts throughout the several views.

The numeral 1 in the drawings represents the frame of a wheeled cultivator of known construction; 2, the arch of the cultivator supported from said frame; 3, the two side beams of the cultivator, suitably connected with the arch, and 4 the cultivator plows or shovels carried by said beams. Four of these plows, two applied to each beam, as shown, are customarily used; but any desired number may be employed, according to the character of work to be done. The planter 5 is also of known construction and may be adapted to plant corn, cotton, or other grain or seed, as desired.

The invention provides means for connecting the planter to the rear of the cultivator-frame and also applying a central or sweep plow to work on a line between and in advance of the cultivator-plows, so as to produce a combination implement whereby the operations of bedding, plowing out the ridges, and planting the seed may be simultaneously performed. The planter follows in the rear of the central or sweep plow and deposits the seed in the furrow formed thereby, and the attachment is so mounted as to allow the cultivator-beams to be under the complete control of the driver or operator and to swing freely without interference. The construction of the attachment for attaining these ends will now be described.

To the arch 2 of the cultivator is secured by clips 6, so as to be vertically adjustable, a bar 7, which serves as a coupling and draft appliance connecting the center beam of the attachment and the planter to the cultivator-frame. This bar, as shown in Figs. 1 to 6, inclusive, is of V form and is rigidly connected with the tongue or pole of the cultivator by a brace 8, provided at its rear end with a hook-shaped coupling member 9. As shown in Fig. 7, however, the bar may be straight and formed with a looped offset 10 for the reception of the rear end of the brace, which in this case is provided with an eye 11, through which passes a pin 12, coupling it to said offset.

Disposed between the side beams 3 is the beam 13, which constitutes the center beam of the combination implement. This beam 13 is provided at its forward end with a coupling member having a ring 14, which engages the hook 9, whereby the beam is swiveled or loosely connected to the bar 7 and brace 8 in such manner as to swing both laterally and vertically to accommodate itself to the play and adjustments of the side beams 3. A transverse bar 15 extends beneath the said center beam 13 and is pivoted thereto by a bolt 16, and each end of this bar is formed with a row or series of apertures 17. Each beam 3 is engaged by a U-shaped clip 18, one of whose arms is longer than the other and threaded for the reception of a nut 19 and is adapted to pass loosely through either one of said apertures and to be held in position by the nut to secure the said beam 3 to the bar 15. By this construction the beams 3 are adjustably connected with the bar 15, so that their relative positions may be varied within certain limits as desired, and are also swiveled to the bar, so that they may swing freely in a direction laterally or transversely of the frame 1 without interference from the beam 13, which swings with them. An arched brace 20 is pivoted to the upper surface of the center beam 13 upon the bolt 16 and has its ends rigidly secured to the bar 15 to reinforce the same in an effective manner.

The center sweep-plow 21 is carried by a forwardly-curved standard 22, suitably secured to the beam 13, and has position on a line between and in advance of the cultivator-plows 4 and forms the furrow into which the seed from the planter 5 is deposited, by which arrangement the operation of bedding and breaking up the ridges will be simultaneously effected. The standard 22 is reinforced from the center beam by a brace 23. Coupling-plates 24 are pivoted to the rear end of the beam 13 upon a suitable pivot or pivots 25 and are adapted to be pivotally attached at their free ends to the beams of the planter 5. By this construction the center and side beams are free to have the necessary vertical play without affecting the planter and the latter is made to follow in the path of travel of the center and forward plow-shovel 21.

The mode of operation of the invention will be readily understood by those conversant with the art from the foregoing description, taken in connection with the accompanying drawings, and the advantages thereof also readily perceived. By simply detaching the center beam the cultivator may be used alone strictly for cultivating purposes. By adjusting the bar 7 the front end of the center beam may be raised and lowered, as desired.

While the preferred embodiment of the invention is as herein disclosed, still changes in the form, construction, and arrangement of the parts may be made within the scope of the invention without departing from the spirit or sacrificing any of the advantages thereof.

Having thus described the invention, what is claimed as new is—

1. In a device of the character described, the combination of a cultivator, a planter, means for attaching the planter to the cultivator, and a plow carried by said attaching means and arranged between and in advance of the plows of the cultivator and in advance of the planter to form a center furrow in which the planter deposits the seed, substantially as described.

2. The combination with the frame and side beams of a cultivator, of a center beam swiveled to the frame and beams, a plow carried by said center beam, and means for attaching a planter to said center beam, substantially as described.

3. The combination with the frame, arch and side beams of a cultivator, of means for attaching a center plow and a planter thereto, said means having a pivotal connection with the arch and beams, substantially as described.

4. The combination with the frame, arch and side beams of a cultivator, of a bar adjustably connected to the arch, a center beam swiveled to the bar, a swiveled connection between the center and side beams, and a plow carried by the center beam to work in advance of the plows carried by the side beams, substantially as described.

5. The combination with the frame, arch and side beams of a cultivator, of a bar adjustably connected to the arch, a center bar pivotally connected to said beam and carrying a plow, a transverse bar secured to the center beam, swivel-couplings uniting the ends of said transverse bar to the side beams, and means for attaching a planter to said center beam, substantially as described.

6. An attachment for cultivators, comprising a bar adapted to be adjustably connected to the frame of the cultivator, a center beam adapted to be pivotally connected to said bar, a transverse bar secured to the center beam, adjustable swiveled couplings on the ends of said bar for attaching the same to the side beams of the cultivator, a plow carried by the center beam, and means for attaching a planter to said center beam, substantially as described.

In testimony whereof we affix our signatures in presence of two witnesses.

PETER O. NOREN. [L. S.]
  MILE D. CLYBURN. [L. S.]

Witnesses:
 C. L. HUGHES,
 L. T. CLYBURN.